(12) United States Patent
Park et al.

(10) Patent No.: US 9,335,582 B2
(45) Date of Patent: May 10, 2016

(54) WIRE GRID POLARIZER, AND LIQUID CRYSTAL DISPLAY PANEL AND LIQUID CRYSTAL DISPLAY DEVICE INCLUDING THE SAME

(71) Applicants: Samsung Electronics Co., Ltd., Suwon-si, Gyeonggi-do (KR); Samsung Display Co., Ltd., Yongin, Gyeonggi-Do (KR)

(72) Inventors: Joon-yong Park, Suwon-si (KR);
Sung-hoon Lee, Seoul (KR);
Byung-hoon Kim, Seongnam-si (KR);
Jung-gun Nam, Seoul (KR); Dae-young Lee, Seoul (KR); Dae-hwan Jang, Gwangmyeong-si (KR); Gug-rae Jo, Asan-si (KR); Atsushi Takakuwa, Hwaseong-si (KR)

(73) Assignees: SAMSUNG ELECTRONICS CO., LTD. (KR); SAMSUNG DISPLAY CO., LTD. (KR)

( * ) Notice: Subject to any disclaimer, the term of this patent is extended or adjusted under 35 U.S.C. 154(b) by 64 days.

(21) Appl. No.: 14/289,989

(22) Filed: May 29, 2014

(65) Prior Publication Data
US 2014/0354910 A1 Dec. 4, 2014

(30) Foreign Application Priority Data

May 29, 2013 (KR) .................. 10-2013-0061253

(51) Int. Cl.
G02F 1/1335 (2006.01)
G02B 5/30 (2006.01)
G02F 1/1333 (2006.01)

(52) U.S. Cl.
CPC ........ *G02F 1/133536* (2013.01); *G02B 5/3058* (2013.01); *G02F 1/133345* (2013.01); *G02F 2001/133548* (2013.01); *G02F 2202/36* (2013.01)

(58) Field of Classification Search
CPC ............. G02F 1/133536; G02F 2001/133548; G02B 5/3058; G02B 5/30
USPC ............................................. 349/96, 46, 51
See application file for complete search history.

(56) References Cited

U.S. PATENT DOCUMENTS

| | | |
|---|---|---|
| 5,772,905 A | 6/1998 | Chou |
| 6,243,199 B1 | 6/2001 | Hansen et al. |
| 6,288,840 B1 | 9/2001 | Perkins et al. |
| 6,665,119 B1 | 12/2003 | Kurtz et al. |
| 6,696,220 B2 | 2/2004 | Bailey et al. |
| 6,900,881 B2 | 5/2005 | Sreenivasan et al. |
| 7,090,716 B2 | 8/2006 | McMackin et al. |
| 7,150,622 B2 | 12/2006 | Choi et al. |
| 7,316,554 B2 | 1/2008 | Choi et al. |
| 7,573,546 B2 * | 8/2009 | Lee ..................... G02B 5/3058 349/96 |

(Continued)

FOREIGN PATENT DOCUMENTS

| | | |
|---|---|---|
| KR | 100824782 B1 | 4/2008 |
| KR | 1020120040868 A | 4/2012 |

*Primary Examiner* — Sang V Nguyen
(74) *Attorney, Agent, or Firm* — Cantor Colburn LLP (57) ABSTRACT

A wire grid polarizer includes a substrate, a wire grid layer which is disposed on the substrate and includes a plurality of wire patterns arranged with a predetermined interval, where gaps are defined between the wire patterns, and a passivation layer which is disposed on the wire grid layer and includes first passivation particles which cover a top portion of the gaps.

16 Claims, 7 Drawing Sheets

(56) References Cited

U.S. PATENT DOCUMENTS

| | | | |
|---|---|---|---|
| 7,648,767 B2 | 1/2010 | Fu et al. | |
| 7,670,127 B2 | 3/2010 | Heidari | |
| 7,670,758 B2 * | 3/2010 | Wang | G02B 5/1857 427/162 |
| 7,738,056 B2 * | 6/2010 | Tsujimura | G02F 1/133528 349/111 |
| 7,807,087 B2 | 10/2010 | Park et al. | |
| 7,965,357 B2 | 6/2011 | Van De Witte et al. | |
| 8,003,992 B2 * | 8/2011 | Kim | H01L 33/387 257/13 |
| 8,025,833 B2 | 9/2011 | Kodama et al. | |
| 8,027,086 B2 | 9/2011 | Guo et al. | |
| 8,066,930 B2 | 11/2011 | Sreenivasan et al. | |
| 8,072,672 B2 * | 12/2011 | Powers | E06B 9/24 359/227 |
| 8,087,920 B2 | 1/2012 | Cho et al. | |
| 8,152,511 B2 | 4/2012 | Xu et al. | |
| 8,339,706 B2 * | 12/2012 | Fujii | G02B 5/3058 359/485.05 |
| 2003/0227417 A1 * | 12/2003 | English | H01Q 15/248 343/756 |
| 2004/0239833 A1 * | 12/2004 | Kawazu | G02B 5/3058 349/96 |
| 2008/0041816 A1 | 2/2008 | Choo | |
| 2008/0118660 A1 * | 5/2008 | Choi | G02B 5/3058 427/532 |
| 2008/0143638 A1 * | 6/2008 | Kim | G02F 1/133528 345/6 |
| 2008/0149488 A1 | 6/2008 | Lee et al. | |
| 2009/0155583 A1 * | 6/2009 | Xu | B82Y 10/00 428/336 |
| 2010/0079706 A1 * | 4/2010 | Kim | G02B 5/3058 349/96 |
| 2010/0079796 A1 | 4/2010 | Matsushita | |
| 2010/0103517 A1 * | 4/2010 | Davis | C23C 14/04 359/485.05 |
| 2011/0222002 A1 | 9/2011 | Lee | |
| 2012/0057106 A1 * | 3/2012 | Park | G02F 1/133528 349/96 |
| 2013/0271834 A1 * | 10/2013 | Kim | G02B 5/3058 359/485.05 |
| 2014/0098330 A1 * | 4/2014 | Nam | G02B 5/201 349/96 |
| 2014/0146391 A1 * | 5/2014 | Jang | B29D 11/00644 359/485.05 |
| 2015/0028296 A1 * | 1/2015 | Jeong | G02B 5/3058 257/40 |
| 2015/0062497 A1 * | 3/2015 | Nam | G02F 1/133536 349/96 |
| 2015/0062500 A1 * | 3/2015 | Park | G02B 5/3058 349/96 |

* cited by examiner

WIRE GRID POLARIZER, AND LIQUID CRYSTAL DISPLAY PANEL AND LIQUID CRYSTAL DISPLAY DEVICE INCLUDING THE SAME

CROSS-REFERENCE TO RELATED APPLICATIONS

This application claims priority to Korean Patent Application No. 10-2013-0061253, filed on May 29, 2013, and all the benefits accruing therefrom under 35 U.S.C. §119, the content of which in its entirety is herein incorporated by reference.

BACKGROUND

1. Field

The disclosure relates to a wire grid polarizer, and a liquid crystal display ("LCD") panel and an LCD device including the wire grid polarizer.

2. Description of the Related Art

In general, a liquid crystal display ("LCD") device includes an LCD panel that displays an image by controlling light transmitted through liquid crystals, and a backlight unit that provides light to the LCD panel. In such an LCD panel, which displays an image using a liquid crystal layer as an optical shutter, polarized light is incident on the liquid crystal layer. To provide the polarized light to the liquid crystal layer, a polarizer that changes non-polarized light emitted from the backlight unit into polarized light is typically provided in the LCD panel. Recently, a technology of using a wire grid polarizer as a polarizer of an LCD panel has been developed.

A wire grid polarizer typically has a structure, in which a plurality of wire patterns is periodically arranged at a predetermined interval on a transparent substrate. A reflective wire grid polarizer has polarization splitting characteristics, and thus the reflective wire grid polarizer reflects polarized light that is parallel to a wire pattern direction and allows polarized light that is perpendicular to the wire pattern direction to pass therethrough. Accordingly, when such a reflective wire grid polarizer is used as a polarizer of an LCD panel, polarized light reflected by the reflective wire grid polarizer is incident on a backlight unit and is re-used, such that light efficiency may be higher than light efficiency of an existing absorptive polarizing film.

SUMMARY

Provided are a wire grid polarizer, and a liquid crystal display ("LCD") panel and an LCD device including the wire grid polarizer.

Additional features will be set forth in part in the description which follows and, in part, will be apparent from the description, or may be learned by practice of the presented embodiments.

According to an embodiment of the invention, a wire grid polarizer includes: a substrate; a wire grid layer which is disposed on the substrate and includes a plurality of wire patterns arranged at a predetermined interval, in which gaps are defined between the wire patterns; and a passivation layer which is disposed on the wire grid layer and includes first passivation particles which cover a top portion of the gaps.

In an embodiment, the passivation layer may include a first layer including the first passivation particles, and a second layer disposed on the first layer.

In an embodiment, the passivation layer may include a first layer including the first passivation particles, a second layer which is disposed on the first layer and includes second passivation particles smaller than the first passivation particles, and a third layer which is disposed on the second layer.

In an embodiment, the passivation layer may include a first layer including the first passivation particles, a second layer which is disposed on the first layer and includes second passivation particles smaller than the first passivation particles, and a third layer which is disposed on the second layer and includes third passivation particles smaller than the second passivation particles.

In an embodiment, the gaps may be filled with air or in a vacuum state.

In an embodiment, the first passivation particles may have an average diameter greater than a width of each of the gaps.

In an embodiment, the first passivation particles may allow visible light to pass therethrough.

In an embodiment, the first passivation particles may include at least one of silicon oxide and silicon nitride.

In an embodiment, the wire grid polarizer may further include a coating layer disposed on a surface of each of the first passivation particles, in which the coating layer may include a reactive functional group which causes a sol-gel reaction.

In an embodiment, the wire patterns of the wire grid layer may have a pitch equal to or less than ¼ of a wavelength of incident light.

In an embodiment, the wire grid polarizer may be a reflective polarizer or an absorptive polarizer.

According to another embodiment of the invention, a liquid crystal display ("LCD") panel which displays an image using light emitted from a backlight unit, the LCD panel including: a wire grid polarizer which changes polarization of the light emitted from the backlight unit; a thin-film transistor ("TFT") layer disposed on the wire grid polarizer; a liquid crystal layer disposed on the TFT layer; and a polarizer disposed on the liquid crystal layer, where the wire grid polarizer includes: a first substrate which is transparent; a wire grid layer which is disposed on the first substrate and includes a plurality of wire patterns arranged at a predetermined interval, where gaps are defined between the wire patterns; and a passivation layer which is disposed on the wire grid layer and includes first passivation particles which cover a top portion of the gaps.

In an embodiment, the TFT layer may include amorphous silicon (a-Si). The LCD panel may further include a second substrate which is transparent and is disposed on the polarizer.

According to another embodiment of the invention, an LCD device includes: a backlight unit which emits light; and an LCD panel which is disposed on the backlight unit and displays an image using the light emitted from the backlight unit, where the LCD panel includes: a wire grid polarizer which changes polarization of the light emitted from the backlight unit; a TFT layer disposed on the wire grid polarizer; a liquid crystal layer disposed on the TFT layer; and a polarizer is disposed on the liquid crystal layer, where the wire grid polarizer includes: a first substrate which is transparent; a wire grid layer which is disposed on the first substrate and includes a plurality of wire patterns arranged at a predetermined interval, where gaps are defined between the wire patterns; and a passivation layer which is disposed on the wire grid layer and includes first passivation particles which covers a top portion of the gaps.

In an embodiment, the LCD device may further include a reflective plate disposed under the backlight unit.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the invention are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1:
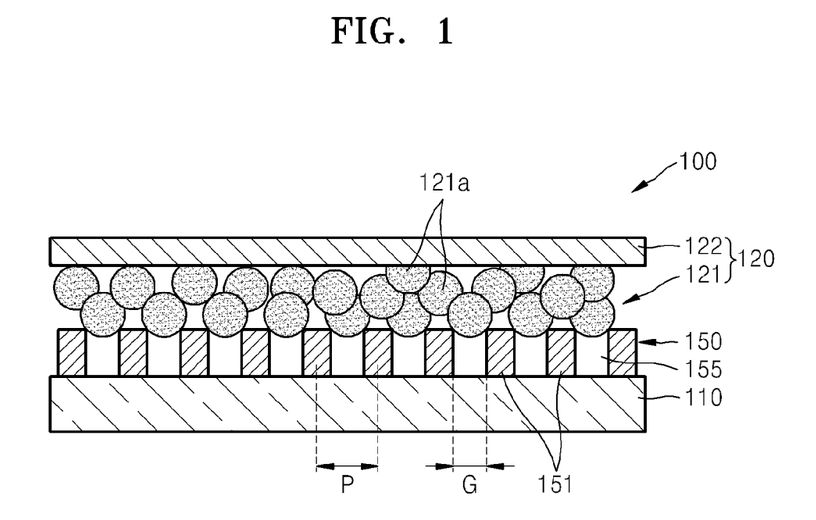
FIG. 1 is a cross-sectional view illustrating an embodiment of a wire grid polarizer, according to the invention.

FIG. 1 is a cross-sectional view illustrating an embodiment of a wire grid polarizer 100, according to the invention.

Referring to FIG. 1, an embodiment of the wire grid polarizer 100 includes a substrate 110, a wire grid layer 150 that is disposed on the substrate 110, and a passivation layer 120 that is disposed on the wire grid layer 150. The substrate 110 may be a transparent substrate. In one exemplary embodiment, for example, the substrate 110 may be, but is not limited to, a glass substrate. The wire grid layer 150 having polarization characteristics is disposed on the substrate 110. The wire grid layer 150 includes a plurality of wire patterns 151 that are periodically arranged at a predetermined interval on a top surface of the substrate 110. In such an embodiment, gaps 155 between the wire patterns 151 may be formed to be substantially parallel to the wire patterns 151.

In such an embodiment, the wire grid polarizer 100 may be a reflective polarizer or an absorptive polarizer. In an embodiment, where the wire grid polarizer 100 is a reflective polarizer, the wire grid polarizer 100 may reflect polarized light that is parallel to a wire pattern direction of the wire patterns 151, and may allow polarized light that is perpendicular to the wire pattern direction to pass therethrough. In such an embodiment, the wire patterns 151 may include, but are not limited to, a metal material such as aluminum (Al), titanium (Ti), chromium (Cr), silver (Ag), gold (Au), nickel (Ni), or molybdenum (Mo), for example. In an embodiment, where the wire grid polarizer 100 is an absorptive polarizer, the wire grid polarizer 100 may absorb polarized light that is parallel to the wire pattern direction, and may allow polarized light that is perpendicular to the wire pattern direction to pass therethrough. In such an embodiment, the wire patterns 151 may include, but are not limited to, a metal material, or a non-metal material such as chromium oxide, for example.

The wire patterns 151 may be disposed on the substrate 110 to have a predetermined pitch P and a predetermined aspect ratio. In one embodiment, for example, the pitch P of the wire patterns 151 arranged on the substrate 110 may be equal to or less than about ¼ of a wavelength of incident light (for example, visible light), and a cross-section of each of the wire patterns 151 may have an aspect ratio equal to or greater than about 1. The wire grid layer 151 including the wire patterns 151 may have a wire fill factor equal to or greater than, for example, about 0.3. However, the embodiment is not limited thereto, and the pitch P, the aspect ratio and the wire fill factor may be variously modified. In one embodiment, for example, when the pitch P is equal to or less than about 200 nanometers (nm) and the wire fill factor is about 0.3, a high luminance may be obtained, but the embodiment is not limited thereto. In an alternative embodiment, when the pitch P is about 140 nm and the wire fill factor is about 0.5, the gaps 155 each having a width G of about 70 nm may be provided between the wire patterns 151.

The passivation layer 120 is disposed on the wire grid layer 150. The passivation layer 120 may protect a structure of the wire grid layer 150, and may effectively prevent the wire grid layer 150 from electrically affecting a thin-film transistor ("TFT") that may be disposed on the passivation layer 120. The passivation layer 120 may include a plurality of layers including a first layer 121 (also referred to as a first passivation layer) that is disposed on the wire grid layer 150 and a second layer 122 (also referred to as a second passivation layer) that is disposed on the first passivation layer 121. The first passivation layer 121 may include first passivation particles 121a having a predetermined size (for example, a nano size) that is large enough to cover a top portion of the gaps 155 between the wire patterns 151. In such an embodiment, the first passivation particles 121a included in the first passivation layer 121 may have an average diameter greater than the width G of each of the gaps 155. In one embodiment, for example, when the gaps 155 have a width G of about 70 nanometers (nm), the first passivation particles 121a may have an average diameter greater than about 70 nm. As such, the top portion of the gaps 155 may be sealed by the first passivation particles 121a, and insides of the gaps 155 may be filled with air. Alternatively, the insides of the gaps 155 may be in a vacuum state. As will be described below, in an embodiment, where the insides of the gaps 155 between the wire patterns 151 are filled with air, polarization characteristics and optical characteristics of the wire grid polarizer 100 may be substantially improved.

The first passivation particles 121a in the first passivation layer 121 may include a material that allows light to pass therethrough. In such an embodiment, the first passivation particles 121a may include a material that allows visible light emitted from a backlight unit 520 to pass therethrough (see FIG. 9). In one embodiment, for example, the first passivation particles 121a may include, but are not limited to, a material having a light transmittance equal to or greater than about 95%. In such an embodiment, the first passivation particles 121a may have, but are not limited to, a refractive index equal to or less than about 2.0. In an embodiment, where a TFT is provided on the passivation layer 120, the first passivation particles 121a included in the first passivation layer 121 may include a material that is compatible with a process of manufacturing a TFT thereon. In one embodiment, for example, the first passivation particles 121a may include a material that is compatible with a wiring etching process of a TFT. In an embodiment, where an amorphous silicon ("a-Si") TFT is provided on the passivation layer 120, the first passivation particles 121a may include a material that is compatible with a high-temperature chemical vapor deposition ("CVD") process. The first passivation particles 121a may include, but are not limited to, silicon oxide such as silica, for example, but not being limited thereto. The first passivation particles 121a may include any of other various materials such as silicon nitride.

Figure 2:
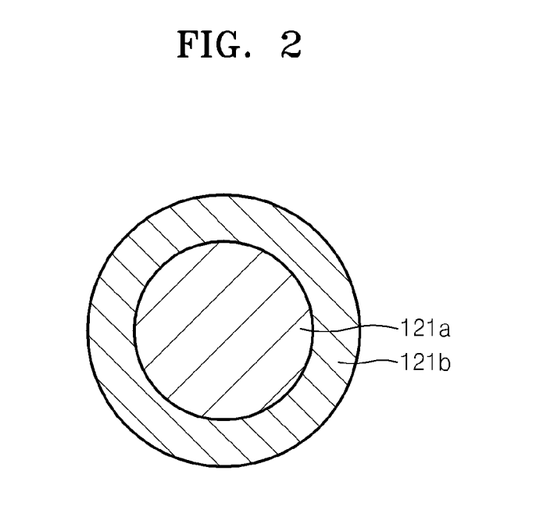
FIG. 2 is a cross-sectional view illustrating an embodiment of a passivation particle of FIG. 1.

FIG. 2 is a cross-sectional view illustrating an embodiment of the first passivation particles 121a of FIG. 1. Referring to FIG. 2, the first passivation layer 121 may further include a coating layer 121b disposed or coated on a surface of each of the first passivation particles 121a. The coating layer 121b may include a material having a reactive functional group that causes a surface reaction to increase an adhesive force between the first passivation particles 121a using a soft backing process and a hard baking process. The coating layer 121b may include a material having a reactive functional group that causes a sol-gel reaction. In such an embodiment, the coating layer 121b may include, but is not limited to, a siloxane-based compound such as methyl silsesquioxane, for example.

The first passivation layer 121 including the first passivation particles 121a may be provided as follows. A solution including silica particles coated with, for example, methyl silsesquioxane, and having an average diameter of about 80 nm or about 140 nm is spin-coated on the wire grid layer 150 in which the wire patterns 151 having a line width of about 70 nm and a height of about 200 nm are arranged to have an interval (that is, the width G of each of the gaps 155) of about 70 nm. A resultant structure is subjected to soft baking at about 120° C. for about 5 minutes, and hard-baking at about 350° C. for about 30 minutes to form the first passivation layer 121 including the silica particles on the wire grid layer 150. The gaps 155 filled with air may be provided between the wire patterns 151 by the silica particles.

In an embodiment, the second passivation layer 122 is disposed on the first passivation layer 121. The second passivation layer 122 may have a flat surface. In such an embodiment, where the first passivation layer 121 includes the first passivation particles 121a having an average diameter greater than the width G of each of the gaps 155, the first passivation layer 121 may have a high surface roughness, a TFT may not be effectively provided on the first passivation layer 121. Accordingly, in such an embodiment, where the second passivation layer 122 that is flat is disposed on the first passivation layer 121 including the first passivation particles 121a, a TFT may be effectively provided or manufactured on the second passivation layer 122. The second passivation layer 122 may include a material that allows light to pass therethrough and is compatible with a process of manufacturing a TFT, like the first passivation layer 121. In one embodiment, for example, the second passivation layer 122 may include, but is not limited to, at least one of silicon oxide and silicon nitride. In one embodiment, for example, the second passivation layer 122 may be provided by depositing a mixture of silicon oxide and silicon nitride on the first passivation layer 121 to have a thickness of about 4,000 angstroms (Å).

In such an embodiment, where the first passivation particles 121a having a diameter greater than the width G of each of the gaps 155 between the wire patterns 151 are disposed on the wire grid layer 150 to form the gaps 155 filled with air or in a vacuum state, polarization characteristics and optical characteristics of the wire grid polarizer 100 may be substantially improved.

Hereinafter, polarization characteristics and optical characteristics of an embodiment of the grid polarizer will be described with reference to FIGS. 5A to 8B.

Figure 5A:
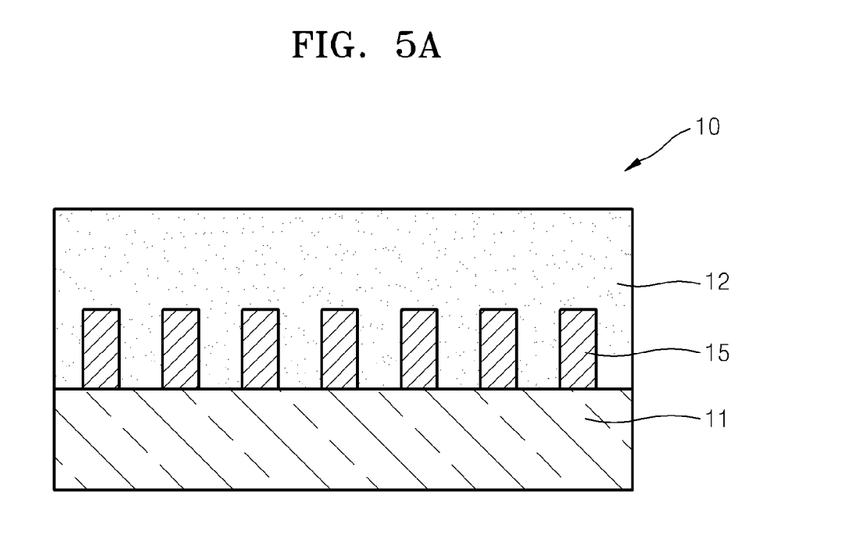
FIG. 5A is a cross-sectional view illustrating a wire grid polarizer in which gaps between wire patterns are filled with a material of a passivation layer.
Figure 5B:
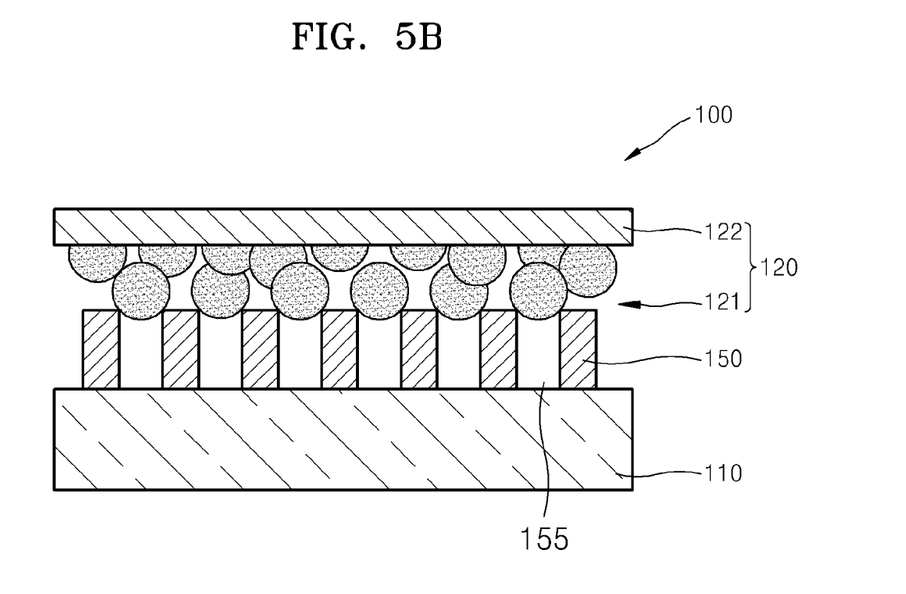
FIG. 5B is a cross-sectional view illustrating the wire grid polarizer of FIG. 1 in which gaps between wire patterns are filled with air.

FIGS. 5A and 5B are cross-sectional views illustrating wire grid polarizers 10 and 100 employed to measure polarization characteristics and optical characteristics. The wire grid polarizer 10 shown in FIG. 5A has a gap fill structure in which a space between the wire patterns on a substrate 11 is filled with a material of a passivation layer 12. The wire grid polarizer 100 shown in FIG. 5 is substantially the same as the wire grid polarizer shown in FIG. 1 and has an air gap structure in which the gaps 155 filled with air are provided by the first passivation particles 121a of the first passivation layer 121.

Figure 6A:
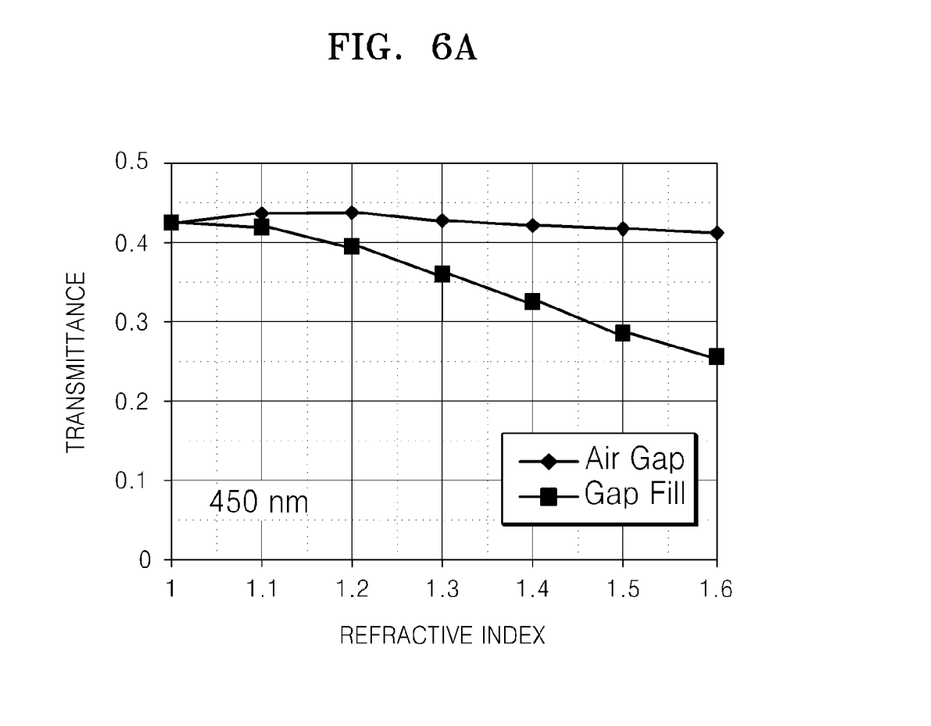
FIG. 6A is a graph illustrating a relationship between light transmittance and a refractive index of a material of a passivation layer when visible light of about 450 nanometers (nm) is incident on the wire grid polarizer of FIG. 5A and the wire grid polarizer of FIG. 5B.

FIG. 6A is a graph illustrating a relationship between light transmittance and a refractive index of a material of a passivation layer when visible light of about 450 nm is incident on the wire grid polarizer 10 having the gap fill structure of FIG. 5A and on the wire grid polarizer 100 having the air gap structure of FIG. 5B. As shown in FIG. 6A, as the refractive index increases, the light transmittance of the wire grid polarizer 10 having the gap fill structure of FIG. 5A substantially decreases, whereas the light transmittance of the wire grid polarizer 100 having the air gap structure of FIG. 5B is not substantially changed.

Figure 6B:
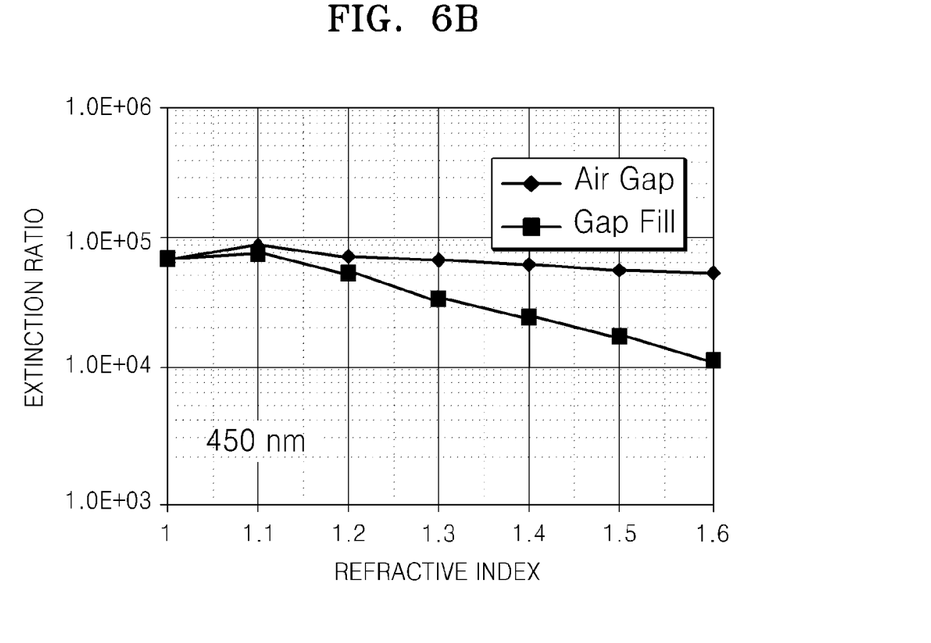
FIG. 6B is a graph illustrating a relationship between an extinction ratio and a refractive index of a material of a passivation layer when visible light of about 450 nm is incident on the wire grid polarizer of FIG. 5A and the wire grid polarizer of FIG. 5B.

FIG. 6B is a graph illustrating a relationship between an extinction ratio and a refractive index of a material of a passivation layer when visible light of about 450 nm is incident on the wire grid polarizer 10 having the gap fill structure of FIG. 5A and on the wire grid polarizer 100 having the air gap structure of FIG. 5B. As shown in FIG. 6B, as the refractive index increases, the extinction ratio of the wire grid polarizer 10 having the gap fill structure of FIG. 5A substantially decreases, whereas the extinction ratio of the wire grid polarizer 100 having the air gap structure of FIG. 5B is not substantially changed.

Figure 7A:
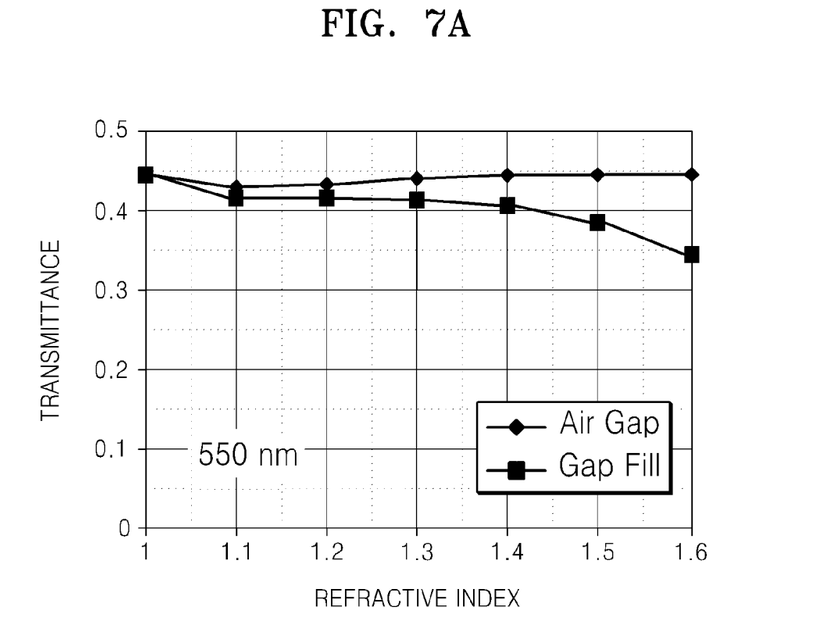
FIG. 7A is a graph illustrating a relationship between light transmittance and a refractive index of a material of a passivation layer when visible light of about 550 nm is incident on the wire grid polarizer of FIG. 5A and the wire grid polarizer of FIG. 5B.
Figure 7B:
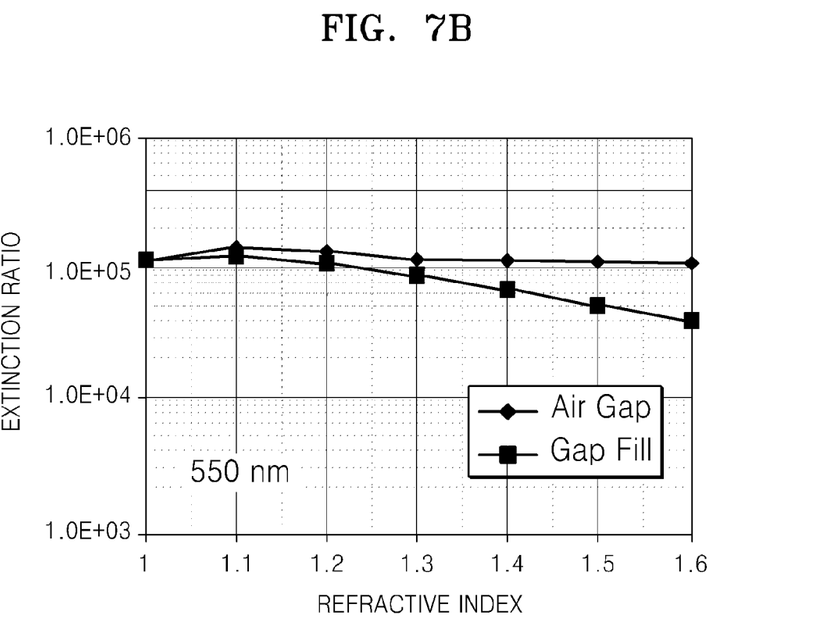
FIG. 7B is a graph illustrating a relationship between an extinction ratio and a refractive index of a material of a passivation layer when visible light of about 450 nm is incident on the wire grid polarizer of FIG. 5A and the wire grid polarizer of FIG. 5B.

FIG. 7A is a graph illustrating a relationship between light transmittance and a refractive index of a material of a passivation layer when visible light of about 550 nm is incident on the wire grid polarizer 10 having the gap fill structure of FIG. 5A and the wire grid polarizer 100 having the air gap structure of FIG. 5B. As shown in FIG. 7A, as a refractive index increases, light transmittance of the wire grid polarizer 10 having the gap fill structure of FIG. 5A substantially decreases, whereas light transmittance of the wire grid polarizer 100 having the air gap structure of FIG. 5B is not substantially changed. FIG. 7B is a graph illustrating a relationship between an extinction ratio and a refractive index of a material of a passivation layer when visible light of about 550 nm is incident on the wire grid polarizer 10 having the gap fill structure of FIG. 5A and on the wire grid polarizer 100 having the air gap structure of FIG. 5B. As shown in FIG. 7B, as the refractive index increases, the extinction ratio of the wire grid polarizer 10 having the gap fill structure of FIG. 5A substantially decreases, whereas the extinction ratio of the wire grid polarizer 100 having the air gap structure of FIG. 5B is not substantially changed.

Figure 8A:
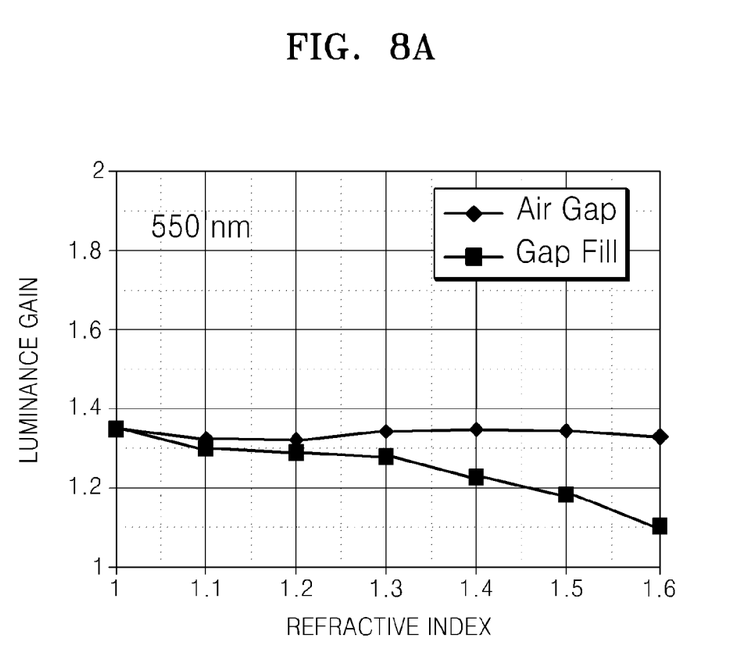
FIG. 8A is a graph illustrating a relationship between a luminance gain and a refractive index of a material of a passivation layer when visible light of about 550 nm is incident on the wire grid polarizer of FIG. 5A and the wire grid polarizer of FIG. 5B.
Figure 8B:
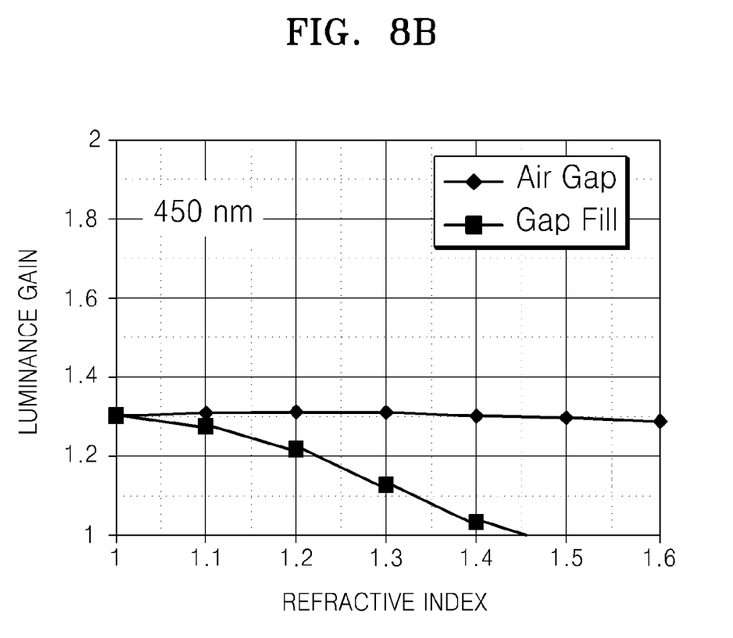
FIG. 8B is a graph illustrating a relationship between a luminance gain and a refractive index of a material of a passivation layer when visible light of about 450 nm is incident on the wire grid polarizer of FIG. 5A and the wire grid polarizer of FIG. 5B.

FIG. 8A is a graph illustrating a relationship between a luminance gain and a refractive index of a material of a passivation layer when visible light of about 550 nm is incident on the wire grid polarizer 10 having the gap fill structure of FIG. 5A and on the wire grid polarizer 100 having the air gap structure of FIG. 5B. As shown in FIG. 8A, as the refractive index increases, a luminance gain of the wire grid polarizer 10 having the gap fill structure of FIG. 5A substantially decreases, whereas the luminance gain of the wire grid polarizer 100 having the air gap structure of FIG. 5B is not substantially changed. FIG. 8B is a graph illustrating a relationship between a luminance gain and a refractive index of a material of a passivation layer when visible light of 450 nm is incident on the wire grid polarizer 10 having the gap fill structure of FIG. 5A and on the wire grid polarizer 100 having the air gap structure of FIG. 5B. As shown in FIG. 8B, as the refractive index increases, the luminance gain of the wire grid polarizer 10 having the gap fill structure of FIG. 5A substantially decreases, whereas the luminance gain of the wire grid polarizer 100 having the air gap structure of FIG. 5B is not substantially changed.

As described above, in an embodiment of the wire grid polarizer 100 having an air gap structure in which the gaps 155 filled with air are provided by the first passivation particles 121a of the first passivation layer 121, polarization characteristics and optical characteristics are substantially improved when compared to a conventional wire grid polarizer, e.g., the wire grid polarizer 10 shown in FIG. 5A, having the gap fill structure, in which the space between the wire patterns 15 is filled with a material of the passivation layer 12.

Table 1 shows optical characteristics of embodiments of a wire grid polarizer having various structures according to a method of forming a passivation layer thereof. In Table 1 below, 'Bare WGP' indicates a wire grid polarizer in which only a wire grid layer is provided on a transparent substrate. The bare WGP may be manufactured by arranging wire patterns having a line width of about 70 nm and a height of about 200 nm at an interval (that is, a width of a gap) of about 70 nm on the transparent substrate. 'Gap Fill WGP' indicates a wire grid polarizer having a gap fill structure in which a space between wire patterns of a wire grid layer is filled with a material of a passivation layer. The wire grid polarizer having the gap fill structure may be manufactured by arranging the wire patterns having a line width of about 70 nm and a height of about 200 nm on a transparent substrate at an interval (that is, a width of a gap) of about 70 nm to form the wire grid layer, spin-coating a siloxane-based silicon-on-glass ("SOG") material on the wire grid layer at about 2,000 revolutions per minute (rpm) for about 30 seconds, and performing soft baking at about 120° C. for about 5 minutes and hard baking at about 400° C. for about 30 minutes. 'Air Gap WGP' indicates a wire grid polarizer having an air gap structure in which insides of gaps between wire patterns are filled with air by passivation particles. The wire grid polarizer having the air gap structure may be manufactured by arranging the wire patterns having a line width of about 70 nm and a height of about 200 nm at an interval (that is, a width of a gap) of about 70 nm on a transparent substrate to form a wire grid layer, spin-coating a solution including silica particles having a predetermined average diameter D coated with methyl silsesquioxane on the wire grid layer at about 2,000 rpm for about 30 seconds, and performing soft baking at about 120° C. for about 5 minutes and hard baking at about 350° C. for about 30 minutes.

TABLE 1

|  | Bare WGP | Gap Fill WGP | Air Gap WGP (D = 90 nm) | Air Gap WGP (D = 140 nm) | Air Gap WGP (D = 180 nm) |
| --- | --- | --- | --- | --- | --- |
| Transmittance Efficiency (%) | 100 | 94.4 | 99.9 | 98 | N/A |
| Polarization Degree Efficiency (%) | 100 | 98.8 | 100 | 100 | N/A |

Referring to Table 1, transmittance efficiency and polarization degree efficiency of the Air Gap WGP including silica particles having average diameters of about 90 nm and about 140 nm are substantially similar to transmittance efficiency and polarization degree efficiency of the Bare WGP, but transmittance efficiency and polarization degree efficiency of the Gap Fill WGP are lower than transmittance efficiency and polarization degree efficiency of the Air Gap WGP. The Air Gap WGP including silica particles having an average diameter of about 180 nm may scatter incident light, such that optical characteristics may be further degraded.

Table 2 shows compatibility with a process of manufacturing a TFT on the embodiments of a wire grid polarizer and a performance of the TFT according to a method of forming a passivation layer of a wire grid polarizer. In Table 2, 'Bare Glass' indicates a case where a process of manufacturing an a-Si TFT is performed on a glass substrate, and 'Gap Fill WGP' indicates a case where a process of manufacturing an a-Si TFT is performed on the wire grid polarizer having the gap fill structure of Table 1. 'Air Gap WGP' indicates a case where a mixture of silicon oxide and silicon nitride is deposited on the wire grid polarizer having the Air Gap structure of Table 1 to a thickness of about 4,000 Å, and a process of manufacturing an a-Si TFT is performed on the deposited mixture.

TABLE 2

|  | Bare Glass | Gap Fill WGP | Air Gap WGP (D = 90 nm) | Air Gap WGP (D = 140 nm) |
| --- | --- | --- | --- | --- |
| TFT Process Compatibility | Acceptable | Acceptable | Acceptable | Acceptable |
| TFT Performance | Acceptable | Acceptable | Acceptable | Acceptable |

Referring to Table 2, the Air Gap WGP including silica particles having average diameters of about 90 nm and about 140 nm has an acceptable compatibility with a process of manufacturing an a-Si TFT and an acceptable performance of a TFT, like the Bare Glass.

Figure 3:
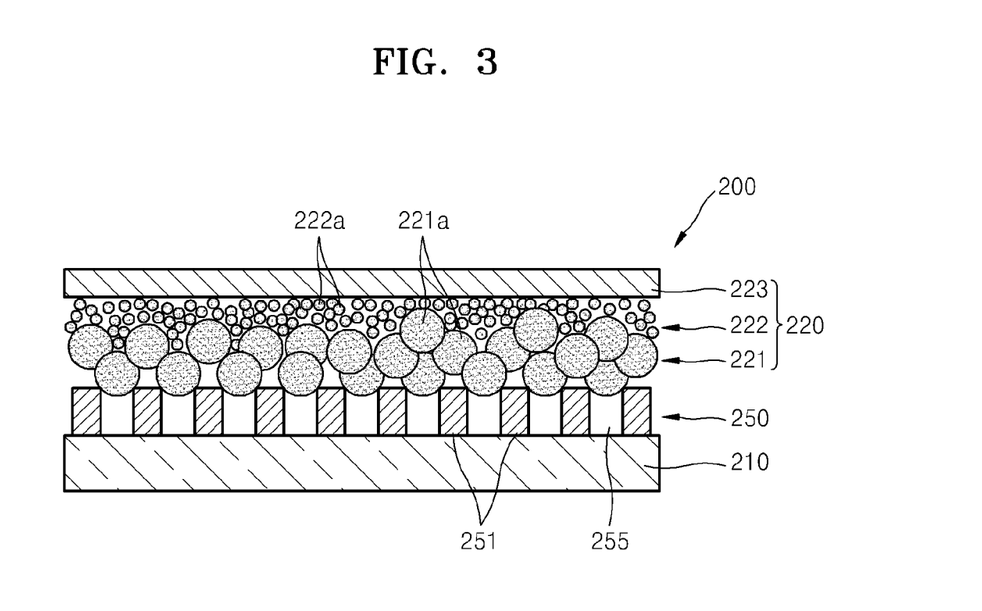
FIG. 3 is a cross-sectional view illustrating an embodiment of a wire grid polarizer, according to the invention.

FIG. 3 is a cross-sectional view illustrating an alternative embodiment of a wire grid polarizer 200, according to the invention.

Referring to FIG. 3, an embodiment of the wire grid polarizer 200 includes a substrate 210, a wire grid layer 250 that is disposed on the substrate 210, and a passivation layer 220 that is disposed on the wire grid layer 250. The substrate 210 may be a transparent substrate. The wire grid layer 250 may include a plurality of wire patterns 251 that are periodically arranged at a predetermined interval on a top surface of the substrate 210, and gaps 255 may be defined between the wire patterns 251. The wire grid polarizer 200 may be a reflective polarizer or an absorptive polarizer. The wire patterns 251 may include a metal material or a non-metal material. The wire patterns 251 may be disposed on the substrate 210 to have a predetermined pitch and a predetermined aspect ratio. In one embodiment, for example, the pitch of the wire patterns 251 arranged on the substrate 210 may be equal to or less than about ¼ of a wavelength of incident light (for example, visible light), and a cross-section of each of the wire patterns 251 may have an aspect ratio equal to or greater than about 1. The wire grid layer 250 including the wire patterns 251 may have a wire fill factor equal to or greater than, for example, about 0.3. However, the embodiment is not limited thereto, and the pitch, the aspect ratio and the wire fill factor may be variously modified.

The passivation layer 220 is disposed on the wire grid layer 250. The passivation layer 220 may include a plurality of layers including a first layer 221 (also referred to as a first passivation layer) that is disposed on the wire grid layer 250, a second layer 222 (also referred to as a second passivation layer) that is disposed on the first passivation layer 221, and a third layer 223 (also referred to as a third passivation layer) that is disposed on the second passivation layer 222. The first passivation layer 221 may include first passivation particles 221a having a predetermined size, e.g., a size large enough to cover a top portion of the gaps 255 between the wire patterns 251. In an embodiment, the first passivation particles 221a included in the first passivation layer 221 may have an average diameter greater than a width of each of the gaps 255. In such an embodiment, the top portion of the gaps 255 are sealed by the first passivation particles 221a, and thus insides of the gaps 255 may be filled with air. Alternatively, the insides of the gaps 255 may be in a vacuum state.

The first passivation particles 221a included in the first passivation layer 221 may include a material that allows light to pass therethrough. The first passivation particles 221a may include a material that allows visible light emitted from, for example, a backlight unit, to pass therethrough. In one embodiment, for example, the first passivation particles 221a may include, but are not limited to, a material having light transmittance equal to or greater than about 95% and a refractive index equal to or less than about 2.0. In such an embodiment, the first passivation particles 221a may include a material that is compatible with a process of manufacturing a TFT thereon. In one embodiment, for example, the first passivation particles 221a may include, but are not limited to, silicon oxide such as silica. A coating layer (not shown) may be disposed or coated on a surface of each of the first passivation particles 221a. The coating layer may include a material having a reactive functional group that causes a surface reaction to increase an adhesive force between the first passivation particles 221a using a soft baking process and a hard baking process. In one embodiment, for example, the coating layer may include, but is not limited to, a siloxane-based compound such as methyl silsesquioxane.

The second passivation layer 222 is disposed on the first passivation layer 221. The second passivation layer 222 may include second passivation particles 222a smaller than the first passivation particles 221a. In such an embodiment, the second passivation particles 222a may have a diameter less than the diameter of the first passivation particles 221a. The second passivation particles 222a may include or be formed of a material having the same characteristics as a material of the first passivation particles 221a. A coating layer (not shown) including, for example, a siloxane compound, may also be provided or coated on a surface of each of the second passivation particles 222a.

The third passivation layer 223 is disposed on the second passivation layer 222. The third passivation layer 223 may have a flat surface. In such an embodiment, where the second passivation layer 222 includes the second passivation particles 222a, the second passivation layer 222 may have a high surface roughness, such that a TFT may not be effectively provide or disposed on the second passivation particles 222a. Accordingly, in an embodiment, the third passivation layer 223 having a flat surface is provided on the second passivation particles 222a, such that a TFT may be effectively disposed or manufactured on the third passivation layer 223. The third passivation layer 223 may include a material that allows light to pass therethrough and is compatible with a process of manufacturing a TFT thereon, like the first and second passivation layers 221 and 222. In one embodiment, for example, the third passivation layer 223 may include, but is not limited to, at least one of silicon oxide and silicon nitride. In such an embodiment, the gaps 255 filled with air may be formed, like in the embodiments described above, such that polarization characteristics and optical characteristics of the wire grid polarizer 200 are substantially improved.

Figure 4:
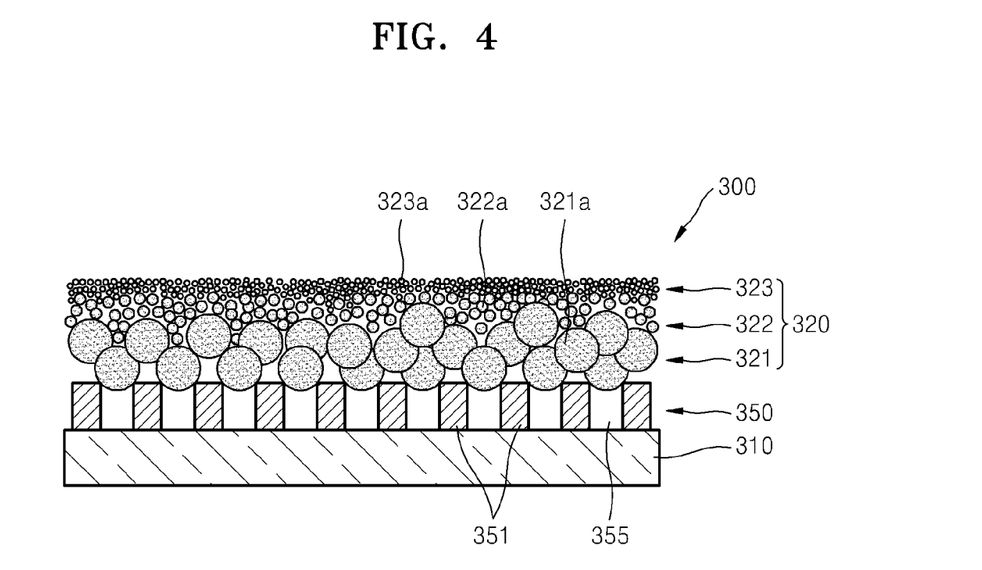
FIG. 4 is a cross-sectional view illustrating an embodiment of a wire grid polarizer, according to the invention.

FIG. 4 is a cross-sectional view illustrating another alternative embodiment of a wire grid polarizer 300, according to the invention. The wire grid polarizer 300 in FIG. 4 is substantially the same as wire grid polarizer 200 shown in FIG. 3 except for the passivation layer, and any repetitive detailed description thereof will hereinafter be omitted or simplified.

Referring to FIG. 4, an embodiment of the wire grid polarizer 300 includes a substrate 310, a wire grid layer 350 that is disposed on the substrate 310, and a passivation layer 320 that is disposed on the wire grid layer 350. The wire grid layer 350 may include a plurality of wire patterns 351 that are periodically arranged at a predetermined interval on a top surface of the substrate 310, and gaps 355 may be defined between the wire patterns 351. The wire grid polarizer 300 may be a reflective polarizer or an absorptive polarizer. The wire patterns 351 may be disposed on the substrate 310 to have a predetermined pitch and a predetermined aspect ratio. In one embodiment, for example, the pitch of the wire patterns 351 arranged on the substrate 310 may be equal to or less than about ¼ of a wavelength of incident light, and a cross-section of each of the wire patterns 351 may have an aspect ratio equal to or greater than about 1. The wire grid layer 350 including the wire patterns 351 may have a wire fill factor equal to or greater than, for example, about 0.3. However, the embodiment is not limited thereto, and the pitch, the aspect ratio and the fill factor may be variously modified.

The passivation layer 320 is disposed on the wire grid layer 350. The passivation layer 320 may include a first passivation layer 321 that is disposed on the wire grid layer 350, a second passivation layer 322 that is disposed on the first passivation layer 321, and a third passivation layer 323 that is disposed on the second passivation layer 322. The first passivation layer 321 may include first passivation particles 321a having a predetermined size, e.g., a size large enough to cover a top portion of the gaps 355 between the wire patterns 351. In such an embodiment, the first passivation particles 321a included in the first passivation layer 321 may have an average diameter greater than a width of each of the gaps 355. In such an embodiment, the top portion of the gaps 355 may be sealed by the first passivation particles 321a, and insides of the gaps 355 may be filled with air. Alternatively, the insides of the gaps 355 may be in a vacuum state.

The first passivation particles 321a included in the first passivation layer 321 may include a material that allows light to pass therethrough and is compatible with a process of manufacturing a TFT thereon. In one embodiment, for example, the first passivation particles 321a may include, but are not limited to, silicon oxide such as silica. A coating layer (not shown) including, for example, a siloxane-based compound, may be disposed or coated on a surface of each of the first passivation particles 321a. The second passivation layer 322 is disposed on the first passivation layer 321. The second passivation layer 322 may include second passivation particles 322a smaller than the first passivation particles 321a. In such an embodiment, the second passivation particles 322a may have a diameter less than the diameter of the first passivation particles 321a. The second passivation particles 322a may include a material that has the same characteristics as a material of the first passivation particles 321a. A coating layer (not shown) may also be formed on a surface of each of the second passivation particles 322a, like on the first passivation particles 321.

The third passivation layer 323 is disposed on the second passivation layer 322. The third passivation layer 323 may include third passivation particles 323a smaller than the second passivation particles 322a. In such an embodiment, the third passivation particles 323a may have a diameter less than the diameter of the second passivation particles 322a. In such an embodiment, where the second passivation layer 322 includes the second passivation particles 322a, the second passivation layer 322 may have a high surface roughness, such that a TFT may not be effectively provided on the second passivation particles 322a. Accordingly, in an embodiment, the third passivation layer 323 including the smaller third passivation particles 323a is disposed on the second passivation layer 322, a TFT may be effectively manufactured on the third passivation layer 323. The third passivation layer 323 including the third passivation particles 323a may have a surface roughness less than a predetermined value, e.g., a value suitable for a process of manufacturing a TFT. An average diameter of the third passivation particles 323a may be determined according to the surface roughness. The third passivation particles 323a may include a material that allows light to pass therethrough and is compatible with a process of manufacturing a TFT, like the first and second passivation particles 321a and 322a. A coating layer (not shown) may be disposed or coated on a surface of each of the third passivation particles 323a, like on the first passivation particles 321a. In such an embodiment, gaps filled with air may be formed, as in the embodiments described above, polarization characteristics and optical characteristics of the wire grid polarizer 300 may be substantially improved.

Figure 9:
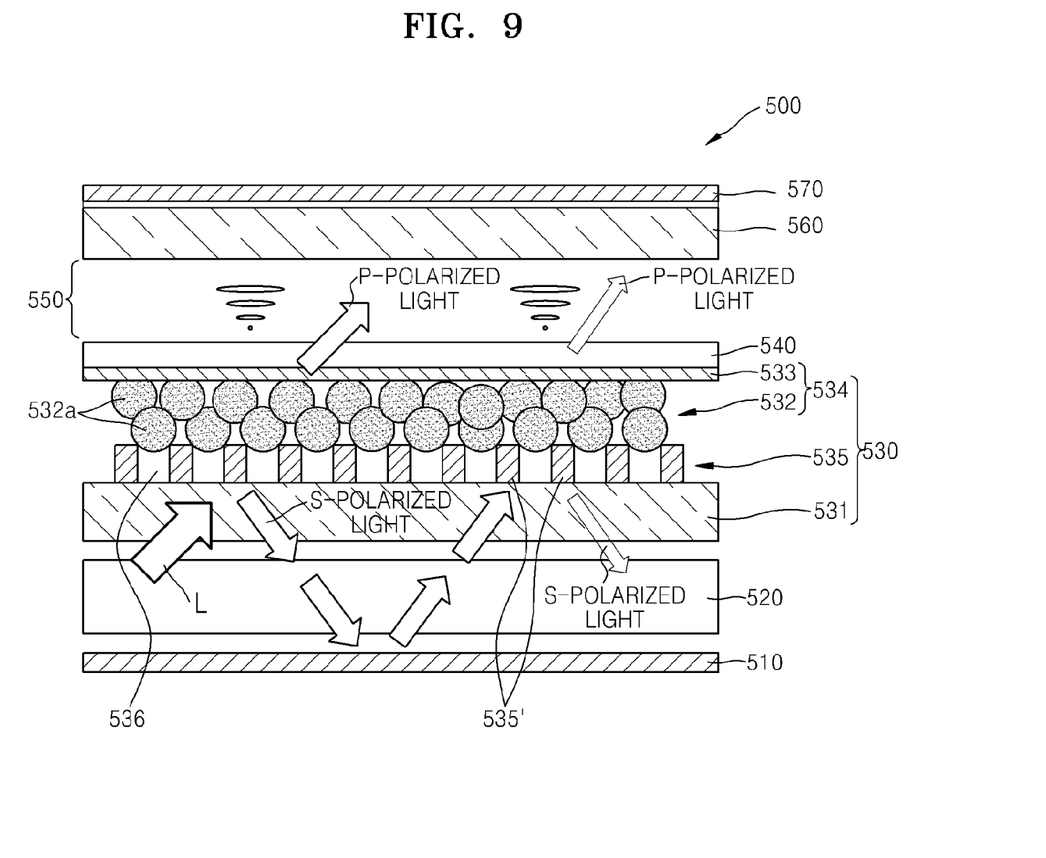
FIG. 9 is a cross-sectional view illustrating a liquid crystal display ("LCD") device, according to the invention.

The embodiments of the wire grid polarizer 100, 200 and 300 shown in FIGS. 1 to 3 and having improved polarization characteristics and optical characteristics may be applied to a liquid crystal display ("LCD") device. FIG. 9 is a cross-sectional view illustrating an embodiment of an LCD device 500, according to the invention.

Referring to FIG. 9, the LCD device 500 includes a backlight unit 520, and an LCD panel that is disposed on the backlight unit 520. The backlight unit 520 may emit light having a predetermined wavelength (for example, visible light). The LCD panel output or display an image using light emitted from the backlight unit 520.

The LCD panel may include a wire grid polarizer 530, a TFT layer 540, a liquid crystal layer 550 and a polarizer 570 which are sequentially disposed on the backlight unit 520. The wire grid polarizer 530 changes polarization of light L emitted from the backlight unit 520. The wire grid polarizer 530 includes a first substrate 531 that is transparent, a wire grid layer 535 that is disposed on the first substrate 531, and a passivation layer 534 that is disposed on the wire grid layer 535. The wire grid layer 535 may be provided by arranging a plurality of wire patterns 535' at a predetermined interval on the first substrate 531, and gaps 536 are defined between the wire patterns 535'. The passivation layer 534 includes a first passivation layer 532 that includes passivation particles 532a that cover a top portion of the gaps 536, and a second passivation layer 533 that is disposed on the first passivation layer 532. The wire grid polarizer 530 may have substantially the same structure as an embodiment of the wire grid polarizer, e.g., the wire grid polarizer 100 of FIG. 1, and any repetitive detailed description thereof will be omitted.

The TFT layer 540 is disposed on the passivation layer 534 of the wire grid polarizer 530. The TFT layer 540 for driving the liquid crystal layer 550 may include a TFT and a driving unit. The TFT may be, but is not limited to, an a-Si TFT. The liquid crystal layer 550 is disposed on the TFT layer 540. The liquid crystal layer 550 that acts as an optical shutter allows polarized light transmitted through the wire grid polarizer 530 to pass therethrough or to be blocked, by an operation of the TFT.

A second substrate 560 that is transparent may be disposed on the liquid crystal layer 550, and the polarizer 570 may be disposed on the second substrate 560. The polarizer 570 may be, but is not limited to, an absorptive polarizing film. In an embodiment, the polarizer 570 is disposed on the second substrate 560 as shown in FIG. 9, but not being limited thereto. In an alternative embodiment, the polarizer 570 may be disposed under the second substrate 560. A reflective plate 510 that reflects incident light may be further disposed under the backlight unit 520.

In an embodiment of the LCD device 500 as described above, the light L emitted from the backlight unit 520 is polarized by the wire grid polarizer 530, and then, for example, S-polarized light is reflected toward the backlight unit 520 and P-polarized light is transmitted through the wire grid polarizer 530. The reflected S-polarized light is transmitted through the backlight unit 530, is reflected again by the reflective plate 510, is combined with light emitted from the backlight unit 520, and is incident again on the wire grid polarizer 530. As described above, in such an embodiment, the LCD device 500 includes the wire grid polarizer 530 having improved polarization characteristics and optical characteristics, such that luminance and light efficiency may be improved. In such an embodiment, polarized light reflected from the wire grid polarizer 534 may be incident on and re-used by the backlight unit 520, such that light efficiency may be further improved. Although the wire grid polarizer 530 is a reflective polarizer in FIG. 9, the embodiment is not limited thereto and the wire grid polarizer 530 may be an absorptive polarizer. In such an embodiment, as shown in FIG. 9, the LCD device 500 may include the wire grid polarizer 530 having the same structure as the wire grid polarizer 100 of FIG. 1, the embodiment is not limited thereto. In an alternative embodiment, the LCD device 500 may include an alternative embodiment of the wire grid polarizer, e.g., the wire grid polarizer 200 of FIG. 3 or the wire grid polarizer 300 of FIG. 4.

According to one or more embodiments, as described above, a passivation layer including passivation particles having a diameter greater than a width of each of gaps between wire patterns is disposed on a wire grid layer, and gaps filled with air is thereby provided between wire patterns such that polarization characteristics and optical characteristics of a wire grid polarizer may be improved. In such embodiments, the wire grid polarizer may have an acceptable compatibility with a process of manufacturing an a-Si TFT including a high-temperature process.

While the invention has been particularly shown and described with reference to exemplary embodiments thereof, it will be understood by those of ordinary skill in the art that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various modifications and other equivalent embodiments may be made from the inventive concept.

What is claimed is:

1. A wire grid polarizer comprising:
   a substrate;
   a wire grid layer which is disposed on the substrate and comprises a plurality of wire patterns arranged at a predetermined interval, wherein gaps are defined between the wire patterns; and
   a passivation layer which is disposed on the wire grid layer and comprises first passivation particles which cover a top portion of the gaps,
   wherein the passivation layer further comprises:
   a first layer comprising the passivation particles;
   a second layer disposed on the first layer and comprising second passivation particles smaller then the first passivation particles; and a third layer disposed on the second layer.

2. The wire grid polarizer of claim 1, wherein the third layer comprises third passivation particles smaller than the second passivation particles.

3. The wire grid polarizer of claim 1, wherein the gaps are filled with air or in a vacuum state.

4. A wire grid polarizer comprising:
   a substrate;
   a wire grid layer which is disposed on the substrate and comprises a plurality of wire patterns arranged at a predetermined interval, wherein gaps are defined between the wire patterns; and a passivation layer which is disposed on the wire grid layer and comprises first passivation particles which cover a top portion of gaps, wherein the first passivation particles have an average diameter greater than a width of each of the gaps.

5. The wire grid polarizer of claim 1, wherein the first passivation particles allow visible light to pass therethrough.

6. The wire grid polarizer of claim 5, wherein the first passivation particles comprise at least one of silicon oxide and silicon nitride.

7. The wire grid polarizer of claim 1, further comprising:
a coating layer disposed on a surface of each of the first passivation particles,
wherein the coating layer comprises a reactive functional group which causes a sol-gel reaction.

8. The wire grid polarizer of claim 1, wherein the wire patterns of the wire grid layer have a pitch equal to or less than ¼ of a wavelength of incident light.

9. The wire grid polarizer of claim 1, wherein the wire grid polarizer is a reflective polarizer or an absorptive polarizer.

10. A liquid crystal display panel, which displays an image using light emitted from a backlight unit, the liquid crystal display panel comprising:
a wire grid polarizer which changes polarization of the light emitted from the backlight unit;
a thin-film transistor layer disposed on the wire grid polarizer;
a liquid crystal layer disposed on the thin-film transistor layer; and
a polarizer disposed on the liquid crystal layer,
wherein the wire grid polarizer comprises:
a first substrate which is transparent;
a wire grid layer which is disposed on the first substrate and comprises a plurality of wire patterns arranged at a predetermined interval, wherein gaps are defined between the wire patterns; and
a passivation layer which is disposed on the wire grid layer and comprises first passivation particles which cover a top portion of the gaps,
wherein the passivation layer further comprises:
a first layer comprising the first passivation particles;
a second layer which is disposed on the first layer and comprises second passivation particles smaller than the first passivation particles; and
a third layer disposed on the second layer.

11. The liquid crystal display panel of claim 10, wherein the third layer comprises third passivation particles smaller than the second passivation particles.

12. A liquid crystal display panel, which displays an image using light emitted from a backlight unit, the liquid display panel comprising:
a wire grid polarizer which changes polarization of the light emitted from the backlight unit;
a thin-film transistor layer disposed on the wire grid polarizer;
a liquid crystal layer disposed on the thin-film transistor layer; and
a polarizer disposed on the liquid crystal layer,
wherein the wire grid polarizer comprises:
a first substrate which is transparent;
a wire grid layer which is disposed on the first substrate and comprises a plurality of wire patterns arranged at a predetermined interval, wherein gaps defined between the wire patterns; and
a passivation layer which is disposed on the wire grid layer and comprises first passivation particles which cover a top portion of the gaps, wherein the first passivation particles have an average diameter greater than a width of each of the gaps.

13. The liquid crystal display panel of claim 10, wherein the thin-film transistor layer comprises an amorphous silicon.

14. The liquid crystal display panel of claim 10, further comprising:
a second substrate which is transparent and is disposed on the polarizer.

15. A liquid crystal display device comprising:
a backlight unit which emits light; and
a liquid crystal display panel which is disposed on the backlight unit and displays an image using the light emitted from the backlight unit,
wherein the liquid crystal display panel comprises:
a wire grid polarizer which changes polarization of the light emitted from the backlight unit;
a thin-film transistor layer disposed on the wire grid polarizer;
a liquid crystal layer disposed on the thin-film transistor layer; and
a polarizer disposed on the liquid crystal layer,
wherein the wire grid polarizer comprises:
a first substrate which is transparent;
a wire grid layer which is disposed on the first substrate and comprises a plurality of wire patterns arranged at a predetermined interval, wherein gaps defined between the wire patterns; and
a passivation layer which is disposed on the wire grid layer and comprises first passivation particles which cover a top portion of the gaps,
wherein the passivation layer further comprises:
a first layer comprising the first passivation particles;
a second layer which is disposed on the first layer and comprises second passivation particles smaller than the first passivation particles; and
a third layer disposed on the second layer.

16. The liquid crystal display device of claim 15, further comprising:
a reflective plate disposed under the backlight unit.

* * * * *